United States Patent
Vergnes

(10) Patent No.: US 7,661,011 B2
(45) Date of Patent: Feb. 9, 2010

(54) METHOD AND APPARATUS FOR A VARIABLE PROCESSING PERIOD IN AN INTEGRATED CIRCUIT

(75) Inventor: Alain Vergnes, Trets (FR)

(73) Assignee: Atmel Corporation, San Jose, CA (US)

( * ) Notice: Subject to any disclaimer, the term of this patent is extended or adjusted under 35 U.S.C. 154(b) by 1133 days.

(21) Appl. No.: 10/861,682

(22) Filed: Jun. 4, 2004

(65) Prior Publication Data

US 2005/0089060 A1    Apr. 28, 2005

(51) Int. Cl.
*G06F 1/02* (2006.01)
*H04L 9/28* (2006.01)

(52) U.S. Cl. .......................... 713/501; 380/28

(58) Field of Classification Search ............. 713/501; 380/28
See application file for complete search history.

(56) References Cited

U.S. PATENT DOCUMENTS

| 5,404,402 A | 4/1995 | Sprunk .................. 380/4 |
| 5,533,123 A | 7/1996 | Force et al. .................. 380/4 |
| 6,327,661 B1 | 12/2001 | Kocher et al. ............ 713/193 |
| 6,419,159 B1 | 7/2002 | Odinak .................. 235/492 |
| 7,360,076 B2 * | 4/2008 | Anand et al. ............ 713/151 |
| 2001/0038637 A1 | 11/2001 | Reiner et al. |
| 2002/0054594 A1 | 5/2002 | Hoof et al. |
| 2002/0124178 A1 | 9/2002 | Kocher et al. ............ 713/193 |
| 2002/0131596 A1 | 9/2002 | Boeckeler .................. 380/252 |
| 2003/0005321 A1 | 1/2003 | Fujioka .................. 713/193 |
| 2003/0043800 A1 | 3/2003 | Sonksen et al. |
| 2003/0084333 A1 | 5/2003 | Archambeault et al. ...... 713/200 |
| 2003/0084336 A1 | 5/2003 | Anderson et al. ........... 713/200 |
| 2003/0140301 A1 * | 7/2003 | Litwin et al. .................. 714/784 |

OTHER PUBLICATIONS

Kaps, Jens-Peter et al., Fast DES Implementations for FPGAs and Its Application to a Universal Key-Search Machine, Lecture Notes in Computer Science, vol. 1556, 1999, pp. 234-247.

INPI (Institute National De La Propriete Industrial) Search Report Annix pp. 1 & 2, Apr. 20, 2006 for French application No. 0312485000 filed Oct. 24, 2003.

Corresponding PCT Application No. PCT/US04/34429 International Search Report, Aug. 11, 2006, pp. 1 & 2.

(Continued)

*Primary Examiner*—Thuan N Du
(74) *Attorney, Agent, or Firm*—Schwegman, Lundberg & Woessner, P.A.

(57) ABSTRACT

The invention is a system for modifying the processing period in a digital logic module. The invention comprises the following. A processing circuit is configured to receive an input in order to create an output. A controller is coupled to the processing circuit and is configured to track L manipulations, wherein L is an integer. The controller is further configured to send a select signal to the processing circuit and to cause the processing circuit to manipulate the input over N clock cycles. N is an integer and N is less than or equal to L. N varies over the plurality of processing time periods. An output port is coupled to the processing circuit and is configured to convey the output.

20 Claims, 9 Drawing Sheets

OTHER PUBLICATIONS 04795572.9, "European Application No. 04795572.9, Supplemental European Search Report Mailed Nov. 6, 2008", 3 pages.

Kaps, J, et al., "Fast DES Implementations for FPGAs and Its Application to a Universal Key-Search Machine", *Lectures Notes in Computer Science*, 1556, (1999), 234-247.

04795572.9, "European Application No. 04795572.9, Office Action Mailed Jul. 02, 2009", 6 pages.

* cited by examiner

METHOD AND APPARATUS FOR A VARIABLE PROCESSING PERIOD IN AN INTEGRATED CIRCUIT

CROSS-REFERENCE TO RELATED APPLICATIONS

This application claims priority to French Application Serial Number 03 12485, filed Oct. 24, 2003.

BACKGROUND

1. Field of the Invention

The invention relates to modifying the processing period in digital logic modules and more particularly to reducing the processing period during encryption/decryption in order to make current analysis more difficult.

2. Prior Art

FIG. 1 is schematic illustrating a prior art simplified microcontroller. A microcontroller generally includes a microprocessor, memory, a peripheral module that provides communication, for example Universal Asynchronous Receiver/Transmitter (UART), SPI, and USB, and an interrupt controller. Microcontroller 100 includes microprocessor 102 coupled to memory 104. Address decoder 106 receives and decodes addresses from microprocessor 102 for memory 104 and peripherals 108. Address decoder 106 and peripherals 108 receive addresses on address bus 110 while address decoder 106 transmits select information on memory select 112 and peripheral select 114. Data is transmitted between microprocessor 102, memory 104, and peripherals 108 on data bus 116. A read or a write signal is transmitted between microprocessor 102 and memory 104 and peripherals 108 on read/write signal 117. Microcontroller 100 receives clock signal 118 and reset signal 120. Input 122 includes, for example, timer triggers and UART input data while output 124 includes, for example, UART transmitter output data. Interrupt controller 126 collects and processes interrupt signals from peripherals 108 along interrupt line 128.

Peripherals 108 may be functional logic, for example UART, crypto-processing, digital signal processing (DSP), and digital filtering.

FIG. 2 illustrates one example of a peripheral, a crypto-processor. With a crypto-processor, if a buffer of data must be ciphered or deciphered, software divides the data buffer, also called a message, into several parts. Each part represents data able to be processed during a processing time period. As soon as the part is input to the crypto-processor and/or a start signal is applied, the peripheral begins to process the part. After a period of clock cycles the processing period ends and the crypto-processor provides a ciphered/deciphered part that can be read back by the software. When the data processing is finished, the non-processing time period begins and an interrupt signal may be asserted to inform the microprocessor that the part is ready for reading and crypto-processor is ready to cipher/decipher a new part. Once the new part is input to the crypto-processor and/or a start signal is applied, the non-processing time period ends and a new processing time period begins. The software continues reading and writing parts up to the end of the data buffer.

As the algorithm used by the crypto-processor is executed, current consumption due to digital cell switching increases when the processing starts and decreases when processing ends. The current increases due to operation of the combinatorial (for example AND, OR, INVERT, MUX, and XOR) and sequential (D flip flops, or DFFs) cells in the digital module that execute the algorithm. During a non-processing time period, typically the only toggling is on the clock pins of DFFs. This value, together with a static leakage current, is not significant compared to the current consumed when processing is active.

User interface module 200 processes system data, for example address, data, read/write, and select signals, in order to generate commands and data for algorithm module 202. Algorithm module 202 performs-cipher/decipher according to control command, data and a cipher/decipher key provided by user interface module 200. Peripheral 108 receives a start signal from user interface 200 and organizes the data path into algorithm module 202.

Some crypto algorithms may be represented as a basic combinatorial function concatenated several times to obtain the result. For example, a basic combinatorial function is implemented once and connected to storing means (DFFs or others). A multiplexer is required to select the input of the algorithm function (data input or intermediate result) depending on a controller module n value (n being the number of iteration to perform to obtain the result, 16 for example in the Data Encryption Standard (DES)). The Triple Data Encryption Standard (TDES) uses three, 16 iteration periods.

Controller 204 receives a start signal on start line 206. The start signal triggers a first-cycle signal from controller 204 to multiplexer 208 in algorithm module 202. Multiplexer 208 receives first-cycle signal and selects input from in-data line 210. Input data then goes to combinatorial circuit 212, which, in combination with a key and a cipher, manipulates the input data. Combinatorial circuit 212 begins processing upon receipt of the first-cycle signal and the input data, thus beginning the processing period. Combinatorial circuit 212 transmits the manipulated input data to multiplexer 213. During processing time period, multiplexer 213 receives processing period signal from controller 204 and therefore selects data from combinatorial circuit 212. Multiplexer 213 transmits the manipulated input data to DFF 214, which then sends the manipulated data to output 216, multiplexers 208 and 213. For subsequent iterations, no first-cycle signal is transmitted to multiplexer 208, so multiplexer 208 selects the manipulated input data from DFFs 214 and sends it to combinatorial circuit 214, which again manipulates the input data. Controller 204 keeps track of each iteration and counts down until the last iteration. At the last iteration, controller 204 sends a last-cycle signal to combinatorial circuit 212, indicating the end of the processing time period. The processing period signal from controller 204 triggers multiplexer 213 to select input from DFF 214 rather than combinatorial circuit 212. DFF 214 receives recycled data, which at this point in the cycle is desired output data. An interrupt signal is sent from controller 204 indicating that data available at output 216 is a desired output, so user interface module 200 retrieves the output data from output 216 after an interrupt is asserted.

At the end of processing time period controller 204 is reset and waits for a new sequence to be started. FIG. 3 is a graph illustrating a timing diagram and a current waveform representing activation of combinatorial circuit 212 during the processing period.

When a buffer of data is processed, current consumption can be seen as a series of pulses. The low level period of this waveform represents the current consumption of the clock tree and the clock pin of the DFFs of the peripheral module. The high level period represents combinatorial circuit 212 switching current. By synchronizing external digital analyzer equipment on the rising edge of the pulses, it is possible to store a digital representation of the current. This model can be processed to extract the "key" value of the algorithm without destroying the integrated circuit with an intrusive attack (processing the model is often referred to as a non-intrusive attack). It is based on the difference in current consumption when different data are processed.

Furthermore, multiple waveforms may be analyzed with respect to one another using differential power analysis. By comparing the current value at a given stage of processing, other key elements of the algorithm may be extracted.

FIG. 3 illustrates clock signal 300 and input data 305. Input data 305 is available on input data line 210 (FIG. 2) and represents part of the divided buffer of input data. Start signal 310 is transmitted along start line 206 and triggers the beginning of processing time period 315. Controller 204 counts down, in this case from 15 to zero for DES, with interval value 320. First-cycle signal 325 transmits from controller 204 in conjunction with the first count on interval controller 320. Last-cycle signal 330 transmits from controller 204 in conjunction with the last count on interval controller 320, and signals the end of processing time period 315 and the beginning of non-processing time period 335. Combinatorial circuit 212 is driven with switching data during processing time period 315, drawing more current than during non-processing time period 335.

If a stable clock period is used to schedule the different steps of data processing, processing time period 315 may be detected or observed by non-intrusive methods like current consumption shape analysis. Each time data is processed the current increases to an active range of current, and then decreases to an inactive range of current during non-processing time period 335.

First waveform 340 is compared to second waveform 345. For example, step 2 of 16 for DES may undergo differential power analysis by comparing the current levels in the two waveforms. Consequently, it is possible to determine data processed inside an integrated circuit.

What is needed is a system and method of making the analysis of current consumption more difficult.

SUMMARY OF THE INVENTION

The invention consists of altering, randomly or pseudo-randomly, the number of clock cycles over which an algorithm is performed. The invention may be used in any circuit where digital logic modules are embodied. The invention takes place in the digital part of an integrated circuit. When data is processed in a digital module, combinatorial logic operates and causes an increase in power consumption. The increase in current is primarily due to cell switching, considering only the digital logic. The total cell leakage current is low compared to this switching current.

The system and method reshapes current consumption in order to make current analysis more difficult. Current reshaping is performed during processing time period by an additional combinatorial circuit. For example, rather than completing a DES algorithm in 16 clock cycles, over each processing time period, the invention completes the DES algorithm over 16 or fewer clock cycles. This increases the difficulty of extracting values from the algorithm because each processing period may have a different number of clock cycles during which the algorithm was performed. Step 2 of 16, for example, will be at two different positions on two different waveforms and superimposing the waveforms will not yield as much useful information as in FIG. 3.

BRIEF DESCRIPTION OF THE DRAWINGS

FIG. 6-1 is a timing diagram illustrating the operation of the invention from FIG. 5.

FIG. 6-2 is a timing diagram illustrating the operation of the invention from FIG. 5.

DETAILED DESCRIPTION OF THE INVENTION

Figure 4:
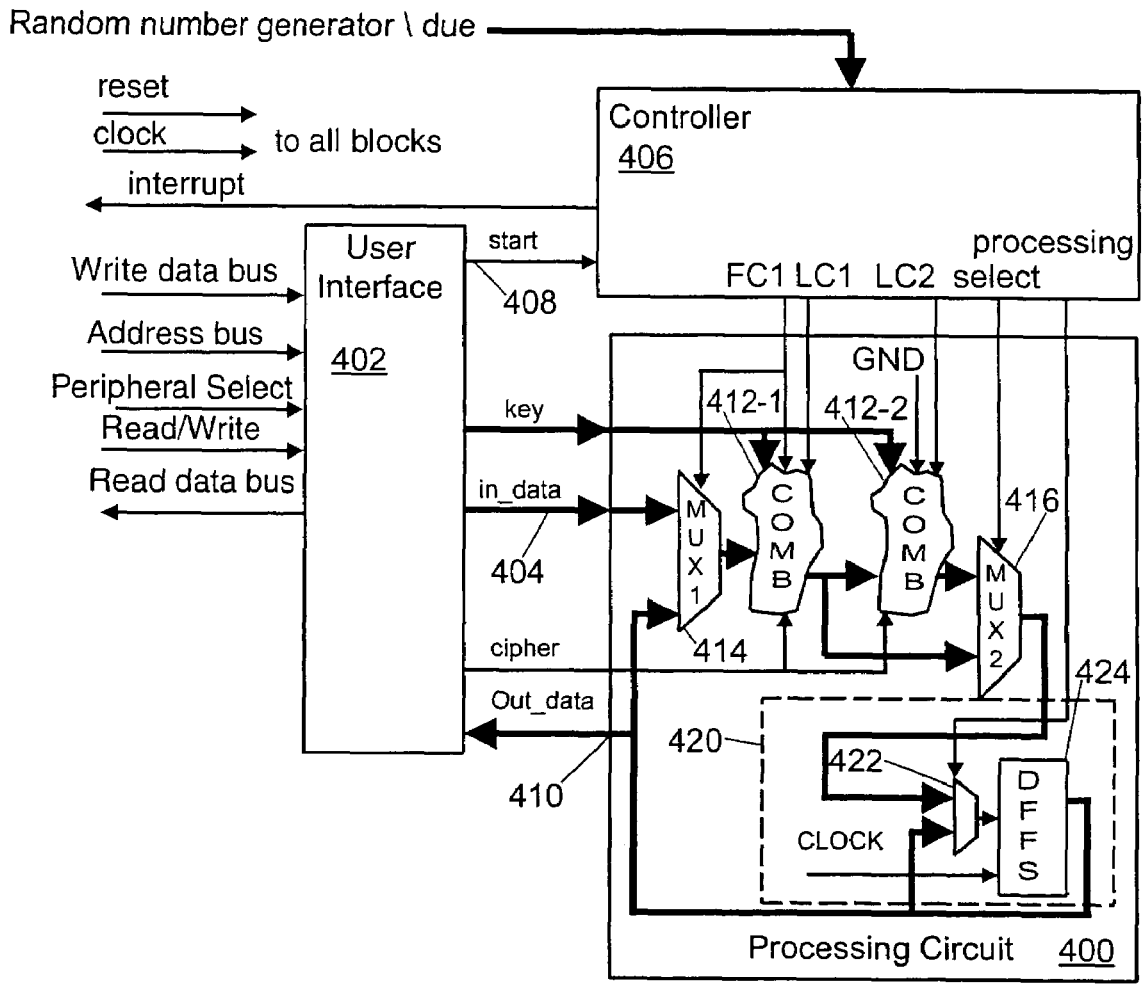
FIG. 4 is a schematic illustrating one embodiment of the invention in a microcontroller.

FIG. 4 is a schematic illustrating one embodiment of the invention in a digital logic module, or a peripheral of a microcontroller. Processing circuit 400 receives input from user interface 402 along input line 404. Controller 406 receives a start signal along start line 408 from user interface 402. Controller 406 transmits a first-cycle signal to processing circuit 400, which begins a processing time period. During a processing time period, processing circuit 400 is manipulating the input in order to produce a desired output, for example an encrypted or decrypted version of the input. Due to the manipulation, for example logic cell switching, processing circuit 400 draws an active range of current during the processing time period and a corresponding waveform of the current over the period may be mapped.

Processing is typically sixteen clock cycles for a DES algorithm. The invention is a method and system of varying the actual number of clock cycles over which the data part of a buffer is manipulated. In one embodiment, at the end of the manipulations, controller 406 transmits a last-cycle signal to processing circuit 400 and the manipulated input is ready at output port 410 as output. The end of the processing time period is the beginning of the non-processing time period. A first and last cycle signal, which are pre-determined for a DES algorithm, are used for special processing, and one of ordinary skill in the art will recognize that these signals may located and/or driven differently in other embodiments without affecting the nature of the invention. The full processing time period will not be required to complete manipulation of a data block for many data blocks.

In one embodiment, processing circuit 400 includes combinatorial circuits 412 connected to multiplexer 414. Multiplexer 414 receives input from input line 404. If multiplexer 414 also receives a first-cycle signal from controller 406, then multiplexer 414 selects the input from input line 404 and sends it to combinatorial circuit 412-1. Combinatorial circuit 412-1 manipulates the input and delivers the manipulated input to combinatorial circuit 412-2 and multiplexer 416. Combinatorial circuit 412-2 receives the manipulated input from combinatorial circuit 412-1, manipulates it and also sends it to multiplexer 416. In the beginning of the processing time period, multiplexer 416 receives input reflective of the first and second steps of, for example, the DES algorithm. Each manipulation may derive from combinatorial circuit 412-1, while each consecutive manipulation following a first manipulation may derive from combinatorial circuit 412-2, depending on random number input received by controller 406. The second step, or each consecutive step of the DES algorithm derives from combinatorial circuit 412-2. In one embodiment, combinatorial circuit 412-1 receives a first-cycle signal and a last-cycle signal. First-cycle signal and last-cycle signal control data flow during the processing time period and signify special processing for a DES algorithm. In one embodiment, combinatorial circuit 412-2 performs the same function as combinatorial circuit 412-1.

A select circuit, or multiplexer 416, receives manipulated input from combinatorial circuits 412. Multiplexer 416 receives a select signal from controller 406 indicating which of the two signals multiplexer 416 directs to its output. Controller 406 tracks the already processed manipulations and generated select signals. Controller 406 further generates select signals based on the remaining required manipulations and a random number input. For example, if combinatorial circuit 412-1 and 412-2 have manipulated input at steps 15 and 16 in the DES cycle, respectively, then the select signal to multiplexer 416 selects the manipulated input from combinatorial circuit 412-2 and the manipulation process for given data is complete. The end of manipulation for given data may occur at the eighth clock cycle in the sixteen round processing algorithm, the ninth, the tenth, and so on, all the way to the sixteenth. The point at which manipulation ends depends on the combination of random signals received by controller 406. For example, if controller 406 receives random signals indicating 1 manipulation per clock cycle for the entire processing time period, then manipulation ends after sixteen clock cycles. At the appropriate time, controller 406 may send a last cycle signal to either combinatorial circuit 412, for special processing required by the DES algorithm.

Storage circuit 420 is connected to and receives input from multiplexer 416. Storage circuit 420 directs the input from multiplexer 416 to multiplexer 414 and output port 410 until manipulation of part of the data buffer is complete. Storage circuit 420 receives a select signal from controller 406, indicating that manipulation is complete and storage circuit 420 should store the recently received data from multiplexer 416. Storage circuit 420 maintains the data through the non-processing time period, and transmits it to output port 410 and multiplexer 414. At the beginning of the next processing time period, processing signal may indicate that storage circuit 420 should stop storing and revert to transmitting whatever input it receives. Storage circuit 420 provides the manipulated part of the data buffer to output port 410 until the next processing time period and receipt by processing circuit 400 of a new part of the data buffer.

In one embodiment, storage circuit 420 includes multiplexer 422 and DFF 424. Multiplexer 422 receives input from DFFs 424 and multiplexer 416. Once multiplexer 422 receives an active high signal from controller 406, multiplexer 422 selects input from multiplexer 416 and send it to DFFs 424. DFFs 424 make the input from multiplexer 422 available to output port 410 and multiplexer 414. Until multiplexer 422 receives a processing signal, the same data cycles between multiplexer 422 and DFFs 424. The processing signal is inactive when processing circuit 400 is finished manipulating a given part of the data buffer. The data cycling between multiplexer 422 and DFFs 424 is made available and read at output port 410, sometime during the non-processing time period. The processing signal toggles multiplexer 422 to select input from multiplexer 416 at the beginning of a new processing time period.

Figure 5:
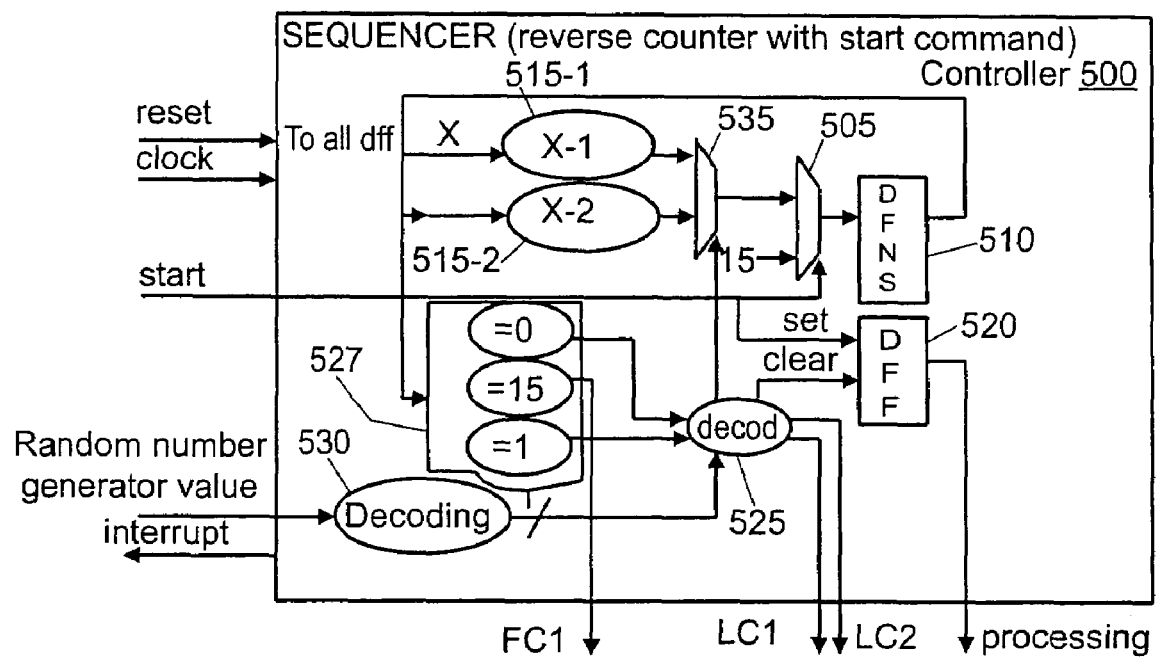
FIG. 5 is a schematic illustrating one embodiment of the invention from FIG. 4.

FIG. 5 is a schematic illustrating a more detailed embodiment of the invention from FIG. 4. One embodiment of controller 406 is controller 500. Controller 500 is one example of a circuit configured to track processing, as well as the number of steps in manipulating each data buffer. One skilled in the art will recognize that different circuits and logic may replace controller 500 and perform a similar function. Controller 500 provides a control signal to processing circuit 410 indicating whether one or two steps of manipulation in a given clock cycle will be completed.

Controller 500 receives a reset signal and resets its count, in one example the count is 16 for DES, so controller 500 counts down from 15 to zero. Controller 500 includes multiplexer 505 that receives the start signal, so upon receiving the reset and start signal, controller 500 transmits a first-cycle signal and resets its DFFs. The start signal causes multiplexer 505 to select the input with a value of 15, in the case of DES. The value of 15 is transmitted to DFFs 510, which then hold and transmit the value to subtractors 515 and counter 527. Furthermore, the start signal causes DFF 520 to be set and sets a value of 15 on the counter. When DFF 520 is set, the processing signal indicates that storage circuit 420 (see FIG. 4) should transmit data it receives, rather than stored data.

Subtractor 515-1 subtracts one from the input, so when receiving a value of 15, subtractor 515-1 outputs a value of 14. Subtractor 515-2 subtracts two from the input, so when receiving a value of 15, subtractor 515-2 outputs a value of 13.

Decoder 525 receives input from DFFs 510 (through counter 527) and decoding circuit 530. Decoder 525 receives a signal from decoding circuit 530, which decoder 525 decodes and indicates whether to process two steps or one step of manipulation in a given clock cycle. Decoding circuit 530 receives a random number from a random number generator and sends, in one embodiment, a one-bit signal to decoder 525. Decoder 525 receives the count and transmits the first-cycle signal with a count of 15, for example. Decoder 525 receives the count through decoding circuit 530.

Based on the signal from decoding circuit 530, decoding circuit sends a select signal to multiplexer 535 and processing circuit 400. The select signal will determine whether multiplexer 535 selects the input from subtractor 515-1 or subtractor 515-2. Similarly, the select signal will cause multiplexer 416 to select between input from combinatorial circuits 412. Selection of subtractor 515-1 corresponds to selection of combinatorial circuit 412-1, and selection of subtractor 515-2 corresponds to selection of combinatorial circuit 412-2. For example, the count in controller 500 will decrement by one with the selection of subtractor 515-1 and combinatorial circuit 412-1, signifying that one step was performed within one clock cycle. Alternatively, the count in controller 500 will decrement by two with the selection of subtractor 515-2 and combinatorial circuit 412-2, signifying that two steps were performed within one clock cycle.

The decremented count from multiplexer 535 is transmitted to multiplexer 505, which selects the decremented count in the next clock cycle, as the start signal is no longer indicating the start of a processing time period. The process of decrementing continues, with the random selection of one or two steps per clock cycle. Near the end of manipulation, decoder 527 may indicate a count of one (meaning two manipulations of the data remain). There are two possibilities.

In the first, decoder 525 receives a random number indicating two manipulations are to be performed during the clock cycle, then decoder 525 sends a last-cycle signal to combinatorial circuit 412-2 and clears DFF 520. DFF 520 sends a processing signal to processing circuit 400 indicating that processing is finished and the data to be received should be saved.

In the second possibility, decoder 525 receives a random number indicating one manipulation is to be performed during the clock cycle. The manipulation is performed, and on the following clock cycle, when one step remains in the cycle, i.e. DFF 510 transmits a zero count, then DFF 520 is cleared and sends the processing signal to processing circuit 400. Decoder 525 sends a last-cycle signal to combinatorial circuit 412-1 and the last step in the cycle is completed.

According to this example, sixteen processing steps have occurred during the eight to sixteen clock cycles. As stated above, after the last processing step, DFF 520 sends the processing signal and the final value is made available at output port 410.

Figure 1:
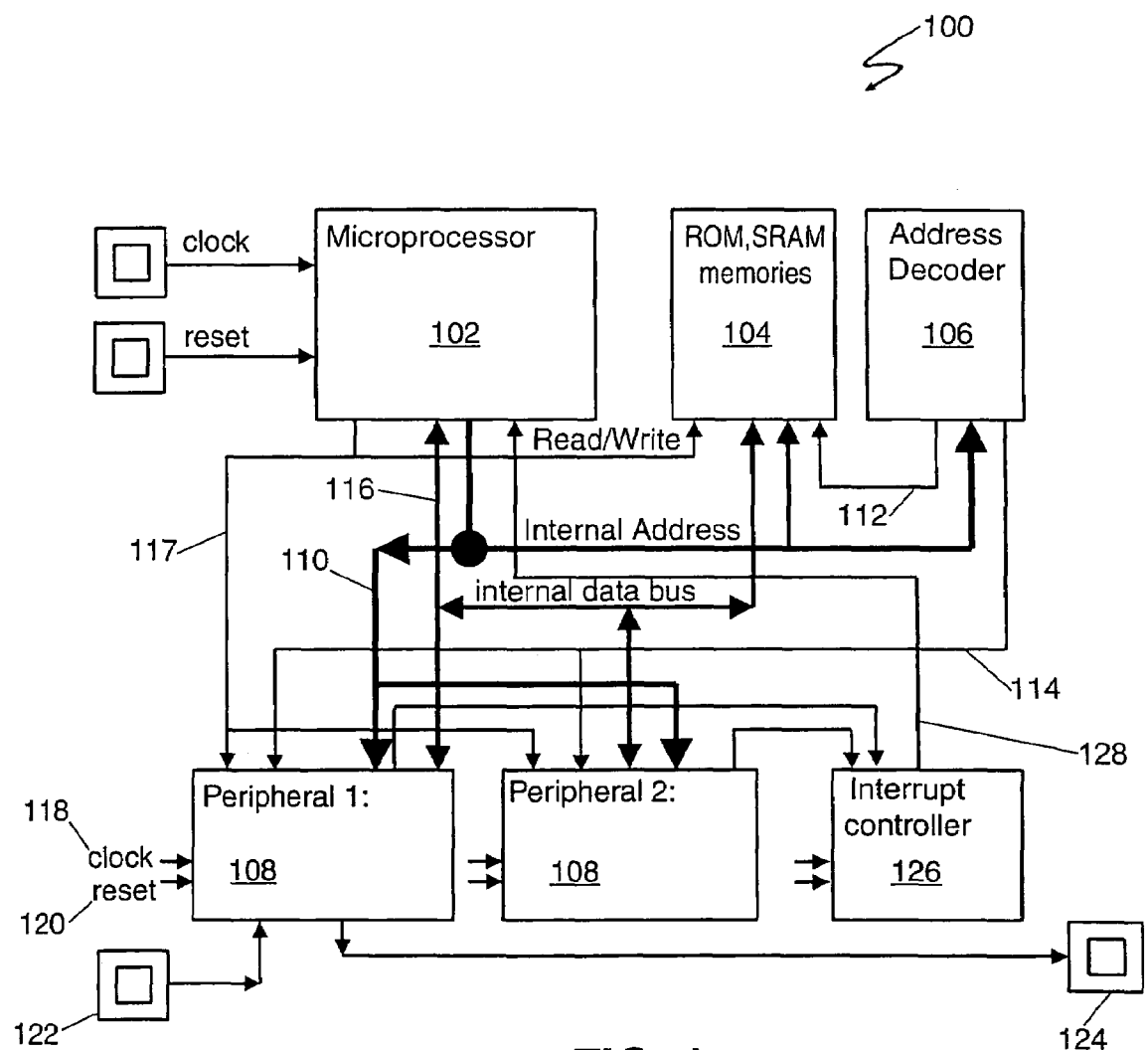
FIG. 1 is a prior art schematic illustrating a simplified microcontroller.
Figures 1, 6:
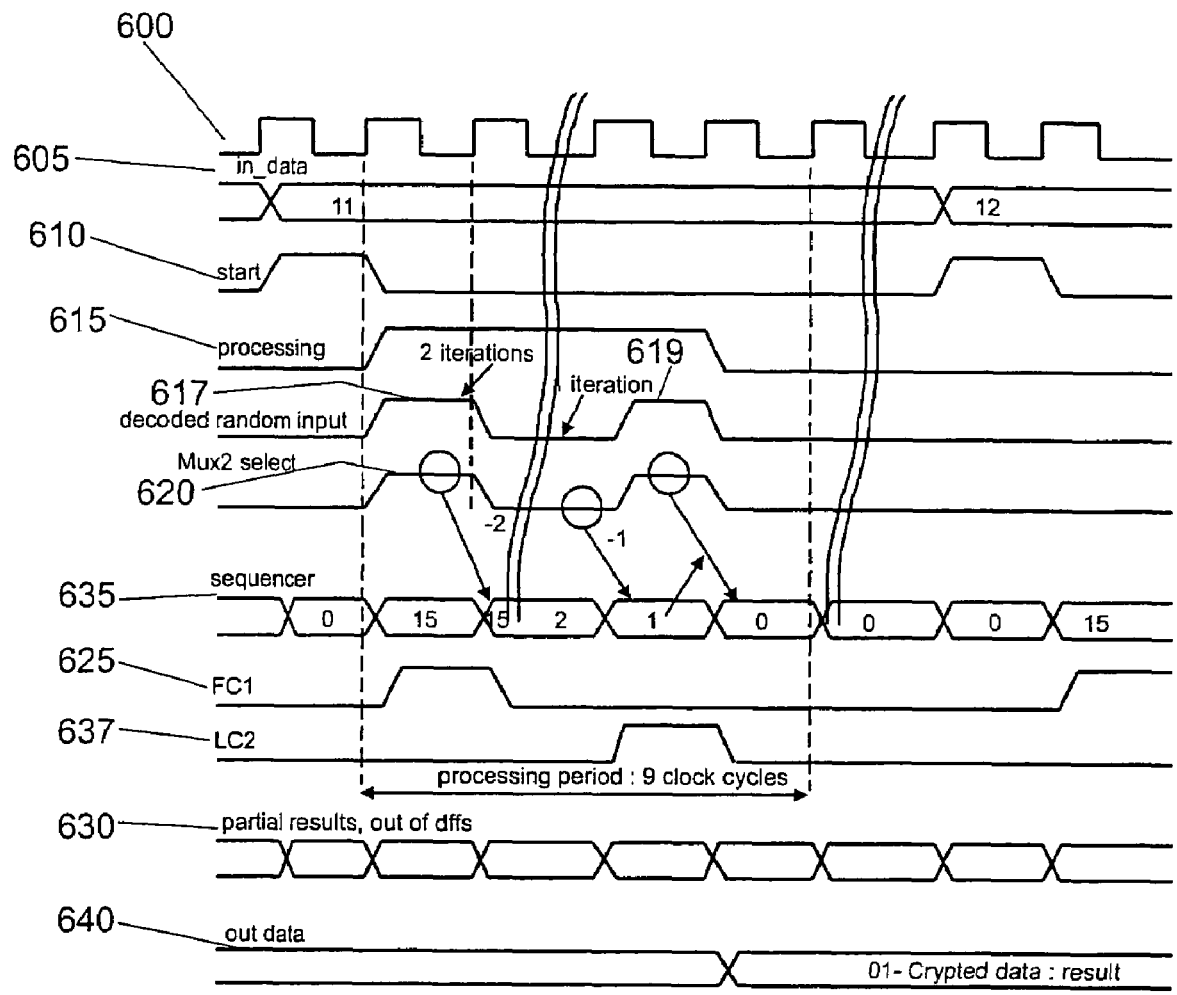
Figures 2, 6:
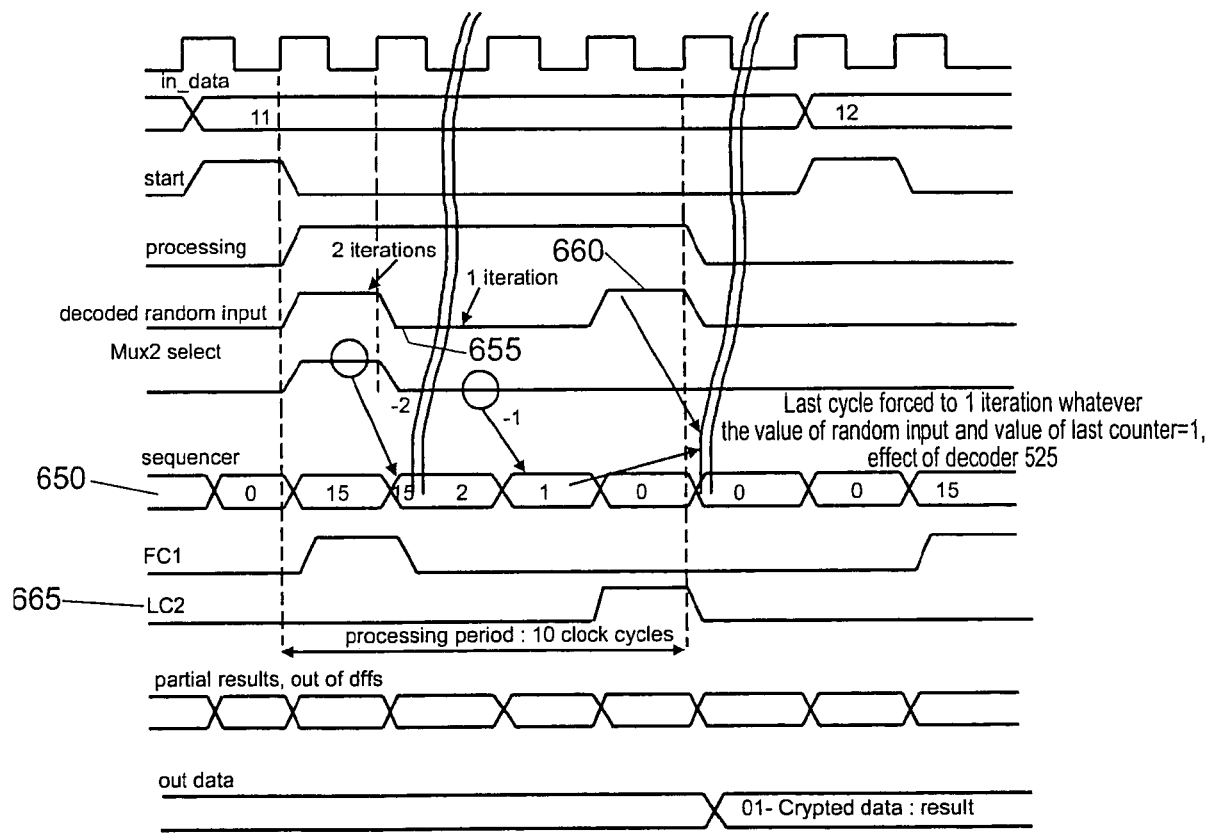

FIG. 6-1 a timing diagram illustrating the operation of the invention from FIGS. 4 and 5. For example, in the beginning of a sixteen-clock cycle processing period 600 for the DES algorithm, multiplexer 414 receives input data 605. Multiplexer 505 receives start signal 610 and selects an input of value of fifteen. Processing signal 615 indicates to processing circuit 400 that while processing is ongoing, storage should not occur. In this example, decoded random input 617 is asserted, indicating 2 iterations, or manipulations, within one clock cycle. Decoder 525 receives decoded random input 617, indicating that two steps should occur in one clock cycle 615, and therefore transmits select signal 620, triggering a decrement of two steps in one clock cycle. Controller 500 decrements the count from 15 to 13, at counter 635, while multiplexer 416 selects the output from combinatorial circuit 412-2. Controller 500 also transmits first cycle signal 620 to processing circuit 400.

Intermediate results 630 are available at output port 410 while counter 635 value decreases to one. Once counter 635 is at one, decoder receives decoder random input 619, indicating a decrement of two, so select signal 620 is asserted and last cycle signal 635 is sent to combinatorial circuit 412-2 for special processing. On the next clock cycle, processing signal 615 indicates storage circuit 420 should now store the value received and output data 640 is available at output port 410. In this example, nine clock cycles passed while processing the input data.

Figure 2:
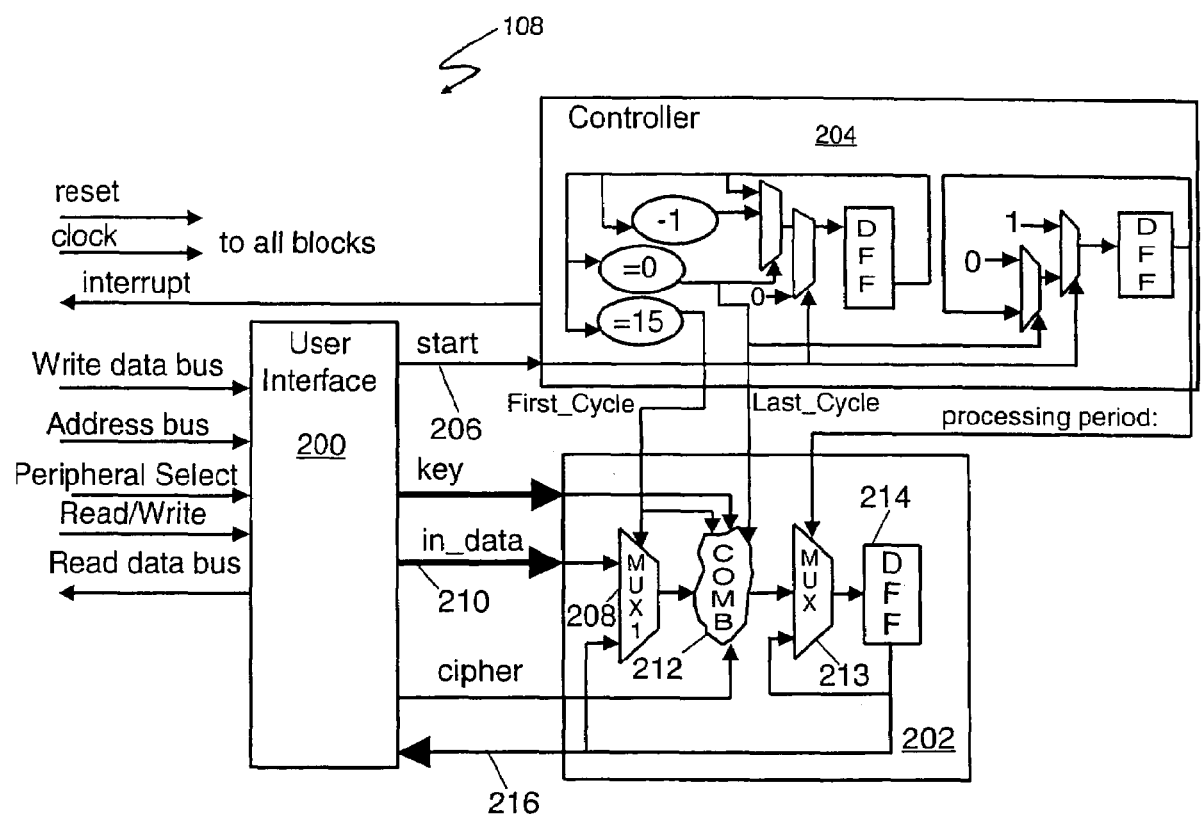
FIG. 2 is a prior art schematic illustrating one example of a peripheral.
Figure 3:
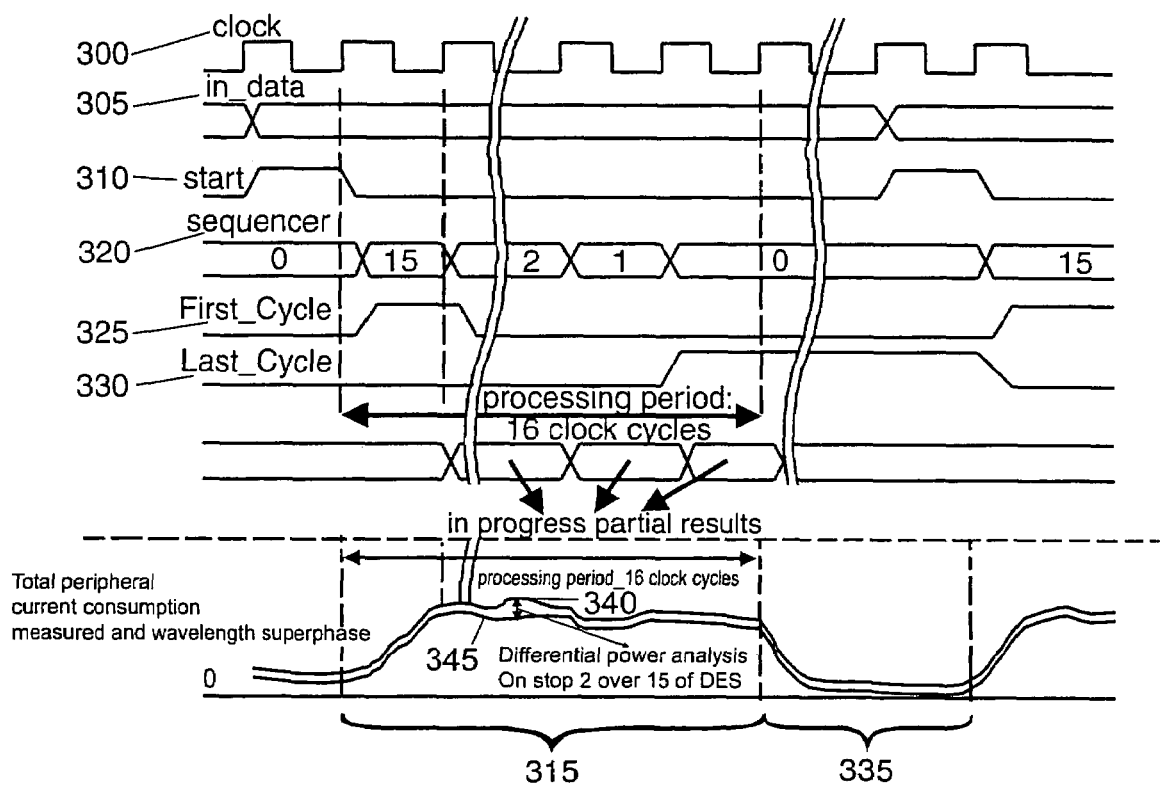
FIG. 3 is a prior art timing diagram illustrating two superimposed current waveforms for a peripheral from FIG. 2.

FIG. 6-2 a timing diagram illustrating the operation of the invention from FIGS. 4 and 5. The differences between FIG. 6-1 and 6-2 will be discussed. When counter 650 is at one, decoder 525 receives decoded random input 655, indicating 1 iteration or manipulation in a clock cycle. On the next clock cycle, decoder 525 receives decoded random input 660, indicating two iterations in a clock cycle. However, because counter 650 indicates zero (one iteration remaining), the two iterations are ignored by decoder 525 and the last cycle performs one iteration. Last cycle signal 665 is asserted to combinatorial circuit 412-1.

Figure 7:
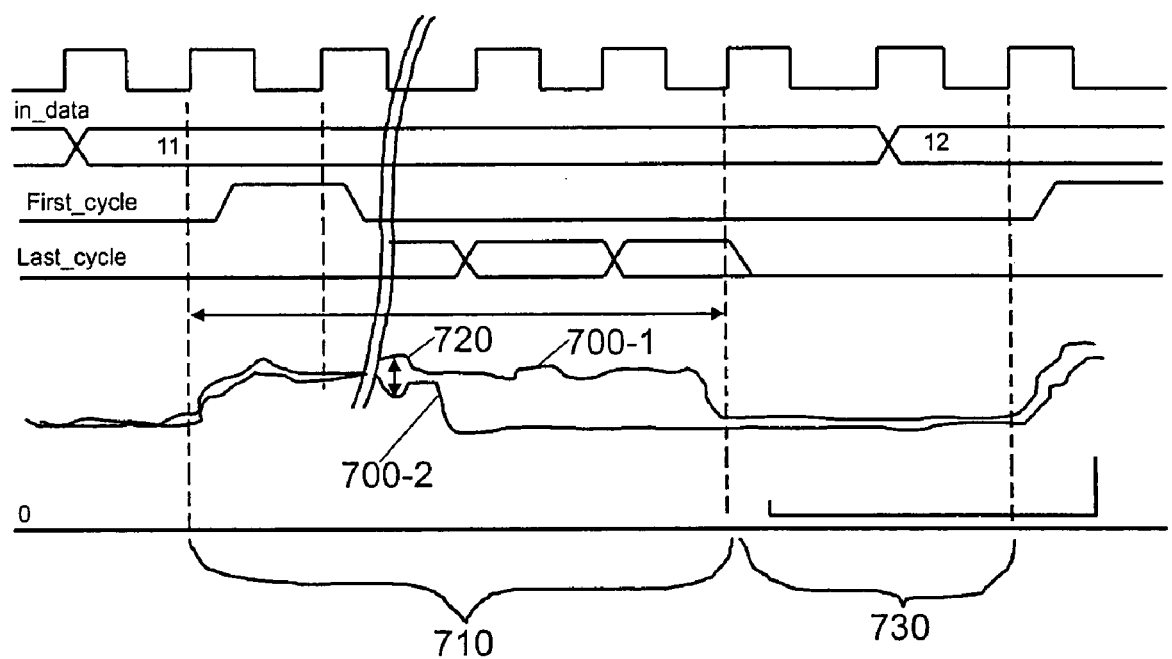
FIG. 7 is a timing diagram illustrating two superimposed current waveforms.

FIG. 7 is a timing diagram illustrating two superimposed current waveforms. Waveform 700-1 formed over processing time period 710, taking, for example, a full sixteen clock cycles. Waveform 700-2 formed over some number of clock cycles less than sixteen. Comparing the waveforms 700 at any point, for example point 720, does not yield as much useful information as in the prior art. Waveform 700-1 may be in step six of the DES cycle while waveform 700-2 may be in step thirteen of the DES cycle, for example. Little useful information may be gained by comparing the waveforms in this manner because they are in different steps of the DES cycle and a point-to-point comparison of the waveforms does not correlate. Non-processing time period 730 follows processing time period 710.

Figure 8:
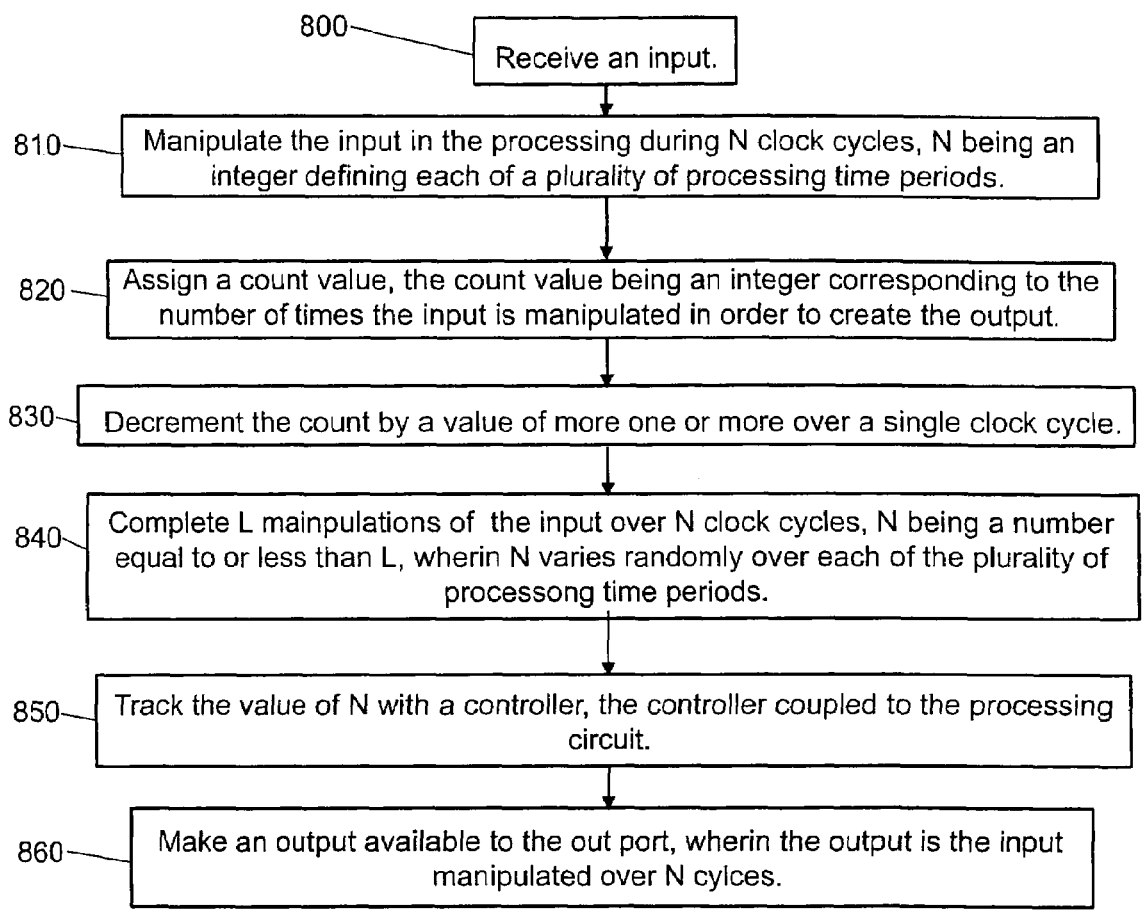
FIG. 8 is a flow diagram illustrating a method for a variable processing period in a digital logic module.

FIG. 8 is a flow diagram illustrating a method for a variable processing period in a digital logic module. In block 800, receive an input. In block 810, manipulate the input in the processing circuit during N clock cycles, N being an integer defining each of a plurality of processing time periods. In block 820, assign a value of L to a count, L being an integer corresponding to the number of times the input is manipulated in order to create the output. In block 830, decrement the count by a value of one or more over a single clock cycle. In block 840, complete L manipulations of the input over N clock cycles, N being an integer and equal to or less than L, wherein N varies randomly over each of the plurality of processing time periods. In block 850, track the value of count initialized L, where L is an integer, and N with a controller, the controller coupled to the processing circuit. In block 860, make an output available to the output port, wherein the output is the input manipulated over N clock cycles.

The following is a method for a variable processing period in a digital logic module. The method first receives a first input. The method then tracks a first processing time period. The first input is then manipulated during the first processing time period. The manipulation of the first input is then completed. A second input is then received. A second processing time period is then tracked, wherein the second processing time period has a different duration from the first processing time period. The second input is then manipulated during the second processing time period. The manipulation of the second input is then completed the duration of manipulation of the first and second input being different, without dummy clock cycles.

One of ordinary skill in the art will recognize that more than one combinatorial or combinatorial-like circuit may be employed in a processing circuit without straying from the invention. Fewer clock cycles within a processing period will be required with more circuits. Additionally, while DES is used as an example, the invention is not limited to DES. As any person skilled in the art will recognize from the previous description and from the figures and claims that modifications and changes can be made to the invention without departing from the scope of the invention defined in the following claims.

The invention claimed is:

1. A system for modifying a processing time during a processing period in a digital logic module comprising:
    a processing circuit configured to receive an input, manipulate the input L times, wherein L is an integer, in order to create an output, the processing circuit further comprising,
        a first combinatorial circuit configured to receive and manipulate the input, and produce a first intermediate output;
        a second combinatorial circuit coupled to the first combinatorial circuit and configured to receive and manipulate the first intermediate output, and produce a second intermediate output; and
        a select circuit coupled to the second combinatorial circuit and configured to receive the select signal and select either the first intermediate output or the second intermediate output, based on the select signal;
    a controller coupled to the processing circuit and configured to track the number of manipulations of the processing circuit, send a select signal to the processing circuit, and cause the processing circuit to create the output over N clock cycles, wherein N is an integer, N is less than or equal to L, and N varies; and
    an output port coupled to the processing circuit and configured to convey the output.

2. The system of claim 1, wherein the variation of N is random.

3. The system of claim 1, wherein the first combinatorial circuit and the second combinatorial circuit are configured to manipulate data in the same manner.

4. The system of claim 1, wherein the first combinatorial circuit and the second combinatorial circuit are configured to manipulate data in the same manner except during a predetermined manipulation of each of a plurality of processing time periods defined by N clock cycles, where the first combinatorial circuit is configured to manipulate data differently than the second combinatorial circuit.

5. The system of claim 1, further comprising:
a storage circuit coupled to the select circuit and configured to receive a processing signal and receive data from the select circuit, the storage circuit further configured to store data received from the select circuit, based on the processing signal.

6. The system of claim 5, wherein the select signal approximately coincides with an end to one of the plurality of processing time periods.

7. The system of claim 5, wherein the storage circuit further comprises:
a multiplexer coupled to the select circuit and configured to receive data from the select circuit; and
a flip-flop coupled to the multiplexer and the output port and configured to store data received from the multiplexer, the flip-flop configured to transmit data to the multiplexer and the output port.

8. The system of claim 1, further comprising:
a start line coupled to the controller and configured to convey a start signal to the controller when the input is available to the processing circuit, wherein the start signal triggers the beginning of each of the plurality of processing time periods; and
an interrupt line coupled to the controller and configured to convey an interrupt signal from the controller when the output is available at the output port, wherein the interrupt signal coincides with the end of each of the plurality of processing time periods and the beginning of each of a plurality of non-processing time periods, each of the non-processing time periods following one of the plurality of processing time periods.

9. The system of claim 1, the controller further comprising:
a subtractor configured to receive a count value and decrement the count value by one or more; and
a decoder coupled to the subtractor and configured to generate a last-cycle signal corresponding to an end of each of a plurality of processing time periods defined by N clock cycles.

10. The system of claim 9, wherein the decoder is configured to decode the count value based on a randomly generated number.

11. The system of claim 9, wherein an initial value of the count is equal to the number of times the input is manipulated over N clock cycles.

12. The system of claim 9, wherein the decoder is configured to generate the select signal.

13. The system of claim 1, wherein the variation of N is predetermined.

14. A system for modifying a processing time during a processing period in a digital logic module comprising:
a processing circuit configured to receive an input in order to create an output, the processing circuit including:
a first combinatorial circuit configured to receive and manipulate the input, and produce a first intermediate output;
a second combinatorial circuit coupled to the first combinatorial circuit and configured to receive and manipulate the first intermediate output, and produce a second intermediate output; and
a select circuit coupled to the second combinatorial circuit and configured to receive the select signal and select either the first intermediate output or the second intermediate output, based on the select signal;
a controller coupled to the processing circuit and configured to track N clock cycles, wherein N is an integer, N clock cycles defining each of a plurality of processing time periods, the controller further configured to send a select signal to the processing circuit and to cause the processing circuit to complete L manipulations of the input over N clock cycles, wherein N is less than or equal to L, L being the number of manipulations required to complete a processing algorithm; and
an output port coupled to the processing circuit and configured to convey the output.

15. The system of claim 14, wherein the first combinatorial circuit and the second combinatorial circuit are configured to manipulate data in the same manner.

16. The system of claim 14, wherein the first combinatorial circuit and the second combinatorial circuit are configured to manipulate data in the same manner except during a predetermined manipulation of each of a plurality of processing time periods defined by N clock cycles, where the first combinatorial circuit is configured to manipulate data differently than the second combinatorial circuit.

17. A system comprising:
a processing circuit configured to receive an input, manipulate the input L times, wherein L is an integer, in order to create an output, the processing circuit including:
a first combinatorial circuit configured to receive and manipulate the input, and produce a first intermediate output;
a second combinatorial circuit coupled to the first combinatorial circuit and configured to receive and manipulate the first intermediate output, and produce a second intermediate output; and
a select circuit coupled to the second combinatorial circuit and configured to receive the select signal and select either the first intermediate output or the second intermediate output, based on the select signal;
a controller coupled to the processing circuit and configured to track the number of manipulations of the processing circuit, send a select signal to the processing circuit, and cause the processing circuit to create output over N clock cycles of one or more fixed processing periods, wherein N is an integer, N is less than or equal to L, and N varies; and
an output port coupled to the processing circuit and configured to convey the output.

18. The system of claim 17, further comprising:
a storage circuit coupled to the select circuit and configured to receive a processing signal and receive data from the select circuit, the storage circuit further configured to store data received from the select circuit, based on the processing signal.

19. The system of claim 18, wherein the select signal approximately coincides with an end to one of the plurality of processing time periods.

20. The system of claim 18, wherein the storage circuit further comprises:
a multiplexer coupled to the select circuit and configured to receive data from the select circuit; and
a flip-flop coupled to the multiplexer and the output port and configured to store data received from the multiplexer, the flip-flop configured to transmit data to the multiplexer and the output port.

* * * * *

UNITED STATES PATENT AND TRADEMARK OFFICE
CERTIFICATE OF CORRECTION

| | | |
|---|---|---|
| PATENT NO. | : 7,661,011 B2 | Page 1 of 1 |
| APPLICATION NO. | : 10/861682 | |
| DATED | : February 9, 2010 | |
| INVENTOR(S) | : Alain Vergnes | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1457 days.

Signed and Sealed this

Twenty-eighth Day of December, 2010

David J. Kappos
*Director of the United States Patent and Trademark Office*